US010719728B2

(12) United States Patent
Zhang et al.

(10) Patent No.: US 10,719,728 B2
(45) Date of Patent: Jul. 21, 2020

(54) METHOD FOR CONTROLLING INFRARED FILL LIGHT AND RELATED PRODUCTS

(71) Applicant: Guangdong Oppo Mobile Telecommunications Corp., Ltd., Dongguan, Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 194 days.

(21) Appl. No.: 16/032,864

(22) Filed: Jul. 11, 2018

(65) Prior Publication Data

US 2019/0026582 A1     Jan. 24, 2019

(30) Foreign Application Priority Data

Jul. 19, 2017   (CN) .......................... 2017 1 0591292

(51) Int. Cl.
*G06K 9/20* (2006.01)
*G06K 9/00* (2006.01)
*G06K 9/22* (2006.01)

(52) U.S. Cl.
CPC ....... *G06K 9/2027* (2013.01); *G06K 9/00033* (2013.01); *G06K 9/0061* (2013.01);
(Continued)

(58) Field of Classification Search
CPC .......... G06K 9/00033; G06K 9/00067; G06K 9/00604; G06K 9/0061; G06K 9/00892; G06K 9/22; G06K 9/2027
(Continued)

(56) References Cited

U.S. PATENT DOCUMENTS 8,340,368 B2 * 12/2012 Lee ........................... C23C 8/80
280/730.1
2015/0356351 A1 * 12/2015 Saylor .................. G06K 9/2036
348/164
(Continued)

FOREIGN PATENT DOCUMENTS

CN         201788518 U    4/2011
CN         104579670 A    4/2015
(Continued)

OTHER PUBLICATIONS

International search report issued in corresponding international application No. PCT/CN2018/095943 dated Oct. 18, 2018.
(Continued)

*Primary Examiner* — Daniel G Mariam

(57) ABSTRACT

A method for controlling an infrared fill light and related products are provided, and the method includes the follows. A reference biometric recognition pattern that is used by a mobile terminal to process a target event is obtained. A target fill-light strategy corresponding to the reference biometric recognition pattern is determined according to a pre-stored mapping relationship between biometric recognition patterns and fill-light strategies of the infrared fill light. The infrared fill light is controlled to fill light according to the target fill-light strategy when the reference biometric recognition pattern is enabled.

18 Claims, 6 Drawing Sheets

(52) U.S. Cl.
CPC ..... *G06K 9/00067* (2013.01); *G06K 9/00604* (2013.01); *G06K 9/00892* (2013.01); *G06K 9/22* (2013.01)

(58) Field of Classification Search
USPC .......................................... 382/116–118, 124
See application file for complete search history.

(56) References Cited

U.S. PATENT DOCUMENTS

| | | | | |
|---|---|---|---|---|
| 2017/0083779 | A1* | 3/2017 | Hung | G06K 9/00892 |
| 2017/0124392 | A1* | 5/2017 | Gu | H04N 5/2257 |
| 2018/0033013 | A1* | 2/2018 | Park | G06Q 20/325 |
| 2018/0307898 | A1* | 10/2018 | Wang | H04N 5/2251 |

FOREIGN PATENT DOCUMENTS

| | | |
|---|---|---|
| CN | 105005390 A | 10/2015 |
| CN | 204965452 U | 1/2016 |
| CN | 105608359 A | 5/2016 |
| CN | 107463885 A | 12/2017 |
| WO | 2009150735 A1 | 12/2009 |
| WO | 2015176657 A1 | 11/2015 |

OTHER PUBLICATIONS

Arun Ross et al: "Handbook of Remote Biometrics for Surveillance and Security: Chapter 11 Multibiometric Systems" In: "Digital Document Processing", Jan. 1, 2009 (Jan. 1, 2009), Springer London, London, XP055529942, ISSN: 1617-7916 ISBN: 978-1-84628-726-8 pp. 273-292, DOI: 10.1007/978-1-84882-385-3_11, the whole document.

Anil K. Jain et al: "Introduction to Biometrics: Chapter 6 Multibiometrics" In: "Introduction to Biometrics", Jan. 1, 2011 (Jan. 1, 2011), Springer Science+Business Media, New York, XP055529996, ISBN: 978-0-387-77325-4 pp. 209-258, the whole document.

Extended European search report issued in corresponding European application No. 18180293.5 dated Dec. 11, 2018.

\* cited by examiner

METHOD FOR CONTROLLING INFRARED FILL LIGHT AND RELATED PRODUCTS

CROSS-REFERENCE TO RELATED APPLICATION(S)

This application claims priority to Chinese Patent Application No. 201710591292.4, filed on Jul. 19, 2017, the content of which is hereby incorporated by reference in its entirety.

TECHNICAL FIELD

The present disclosure relates to the field of mobile terminal technology, and particularly to a method for controlling an infrared fill light and related products.

BACKGROUND

With development of smart phones, more and more applications are installed in user's mobile phones. People's lives, such as reading, payment, games, music, and the like, are inseparable from the mobile phones.

At present, the smart phone is generally configured with a fingerprint recognition pattern, and users need to press the fingerprint module of the smart phone with a fingerprint surface of a finger for fingerprint information verification.

SUMMARY

Implementations of the present disclosure provide a method for controlling an infrared fill light and related products, which can improve the accuracy of a mobile terminal's control of the infrared fill light and power management efficiency.

According to a first aspect of the implementations of the present disclosure, there is provided a mobile terminal. The mobile terminal includes a first biometric recognition unit, a second biometric recognition unit, and an infrared fill light.

The first biometric recognition unit is configured to acquire first biometric information.

The second biometric recognition unit is configured to acquire second biometric information. The second biometric information is different from the first biometric information.

The infrared fill light is configured to fill light according to a first fill-light strategy when the first biometric recognition unit acquires the first biometric information, and fill light according to a second fill-light strategy when the second biometric recognition unit acquires the second biometric information. The second fill-light strategy is different from the first fill-light strategy.

According to a second aspect of the implementations of the present disclosure, there is provided a method for controlling an infrared fill light. The method includes the follows.

A reference biometric recognition pattern that is used by a mobile terminal to process a target event is obtained. A target fill-light strategy corresponding to the reference biometric recognition pattern is determined according to a pre-stored mapping relationship between biometric recognition patterns and fill-light strategies of the infrared fill light. The infrared fill light is controlled to fill light according to the target fill-light strategy, when the reference biometric recognition pattern is enabled.

According to a third aspect of the implementations of the present disclosure, there is provided a mobile terminal. The mobile terminal includes a processing unit and a communicating unit.

The processing unit is configured to obtain a reference biometric recognition pattern that is used when the mobile terminal processes a target event, determine a target fill-light strategy corresponding to the reference biometric recognition pattern according to a pre-stored mapping relationship between biometric recognition patterns and fill-light strategies of an infrared fill light, and control, through the communicating unit, the infrared fill light to fill light according to the target fill-light strategy when the reference biometric recognition pattern is enabled.

According to a fourth aspect of the implementations of the present disclosure, there is provided a mobile terminal. The mobile terminal includes a processor, a memory, a communication interface, and one or more programs.

The one or more programs are stored in the memory and include instructions that when executed, are operable with the processor to execute operations of any method according to the second aspect of the implementations of the present disclosure.

According to a fifth aspect of the implementations of the present disclosure, there is provided a non-transitory computer readable storage medium storing computer programs configured for electronic data interchange. The computer programs, when executed, are operable with a computer to perform all or part of operations of any method according to the second aspect of the implementations of the present disclosure. The computer includes a mobile terminal.

According to a sixth aspect of the implementations of the present disclosure, there is provided a computer program product. The computer program product includes a non-transitory computer readable storage medium for storing computer programs. The computer programs, when executed, are operable with a computer to perform all or part of operations of any method according to the second aspect of the implementations of the present disclosure. The computer program product can be a software installation package. The computer includes a mobile terminal.

BRIEF DESCRIPTION OF THE DRAWINGS

The accompanying drawings used in the implementations will be briefly described below.

DETAILED DESCRIPTION

Figure 1:
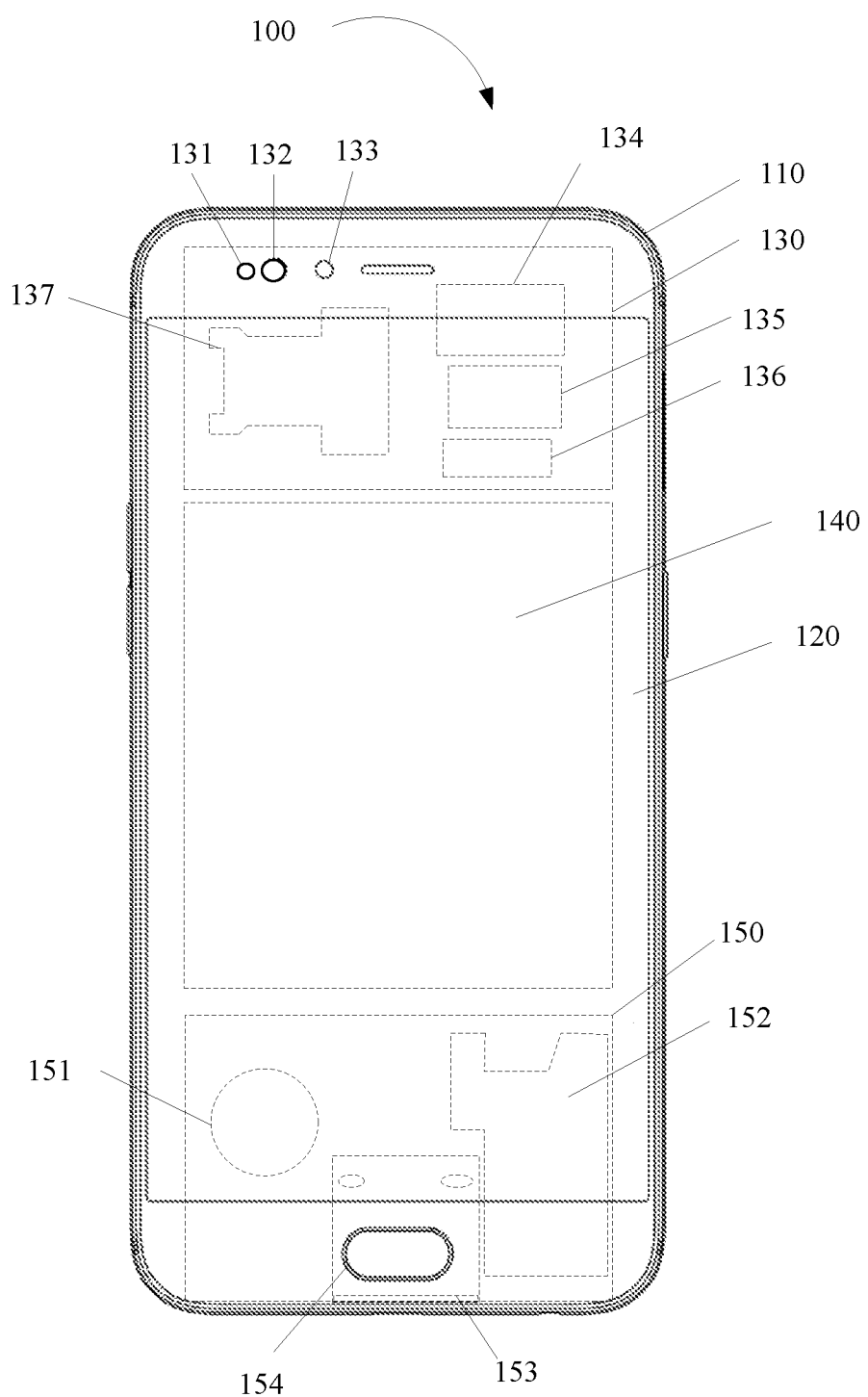
FIG. 1 is a schematic structural diagram illustrating a mobile terminal according to an implementation of the present disclosure.

In order to enable those skilled in the art to better understand the solution of the present disclosure, technical solutions of the present disclosure will be described clearly and completely with reference to the accompanying drawings; obviously, the implementations described below are merely part of rather than all of the implementations of the present disclosure. Based on the implementations of the present disclosure, other implementations obtained therefrom without any creative work by those of ordinary skill in the art shall fall into the protection scope of the present disclosure.

The terms "first", "second" and the like in the specification and claims of the present disclosure and the drawings are used to distinguish different objects rather than describe a specific order. In addition, terms of "including" and "having" and any inflexions thereof are intended to cover a non-exclusive inclusions relationship. For example, processes, methods, systems, products, or devices containing a series of operations or units are not limitative to listed processes or units, other processes or units which are not listed can also be included, or other processes or units inherent to these processes, methods, products or devices can also be included.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The mobile terminal involved in the implementations of the present disclosure may include various handheld devices having wireless communication functions, in-vehicle devices, wearable devices, computing devices or other processing devices connected to the wireless modem, as well as various forms of user equipment (UE), mobile stations (MS), terminal devices, and the like. For the convenience of description, the above-mentioned devices are collectively referred to as a mobile terminal.

According to a first aspect of the implementations of the present disclosure, there is provided a mobile terminal. The mobile terminal includes a first biometric recognition unit, a second biometric recognition unit, and an infrared fill light.

The first biometric recognition unit (assembly) is configured to acquire first biometric information.

The second biometric recognition unit (assembly) is configured to acquire second biometric information. The second biometric information is different from the first biometric information.

The infrared fill light is configured to fill light according to a first fill-light strategy when the first biometric recognition unit acquires the first biometric information, and fill light according to a second fill-light strategy when the second biometric recognition unit acquires the second biometric information. The second fill-light strategy is different from the first fill-light strategy.

In one implementation, the mobile terminal further includes a third biometric recognition unit (assembly). The third biometric recognition unit is configured to acquire third biometric information. The infrared fill light is further configured to fill light according to a third fill-light strategy when the third biometric recognition unit acquires the third biometric information.

In one implementation, the first biometric recognition unit, the second biometric recognition unit, and the third biometric recognition unit are each selected from a group consisting of: an iris recognition unit, an infrared face recognition unit, and a three-dimensional (3D) infrared face recognition unit. The first biometric recognition unit, the second biometric recognition unit, and the third biometric recognition unit are different from each other.

In one implementation, according to the first fill-light strategy, the infrared fill light is controlled to emit infrared light at a first output power. According to the second fill-light strategy, the infrared fill light is controlled to emit infrared light at a second output power. According to the third fill-light strategy, the infrared fill light is controlled to emit infrared light at a third output power. The first output power, the second output power, and the third output power are different from each other.

In one implementation, the mobile terminal further includes a processor.

The processor is configured to obtain reference biometric recognition pattern that is used by the mobile terminal to process a target event, determine a target fill-light strategy corresponding to the reference biometric recognition pattern according to a pre-stored mapping relationship between biometric recognition patterns and fill-light strategies of the infrared fill light, and control the infrared fill light to fill light according to the target fill-light strategy when the reference biometric recognition pattern is enabled.

In one implementation, the biometric recognition patterns include an iris recognition pattern, an infrared face recognition pattern, and a 3D infrared face recognition pattern.

In one implementation, the processor configured to obtain the reference biometric recognition pattern that is used by the mobile terminal to process the target event is further configured to: obtain a security level of the target event, and determine a biometric recognition pattern corresponding to the obtained security level as the reference biometric recognition pattern of the target event, according to a pre-stored mapping relationship between security levels and biometric recognition patterns.

In one implementation, the processor configured to obtain the reference biometric recognition pattern that is used by the mobile terminal to process the target event is further configured to: obtain a plurality of historical processing records of the target event, and determine a biometric recognition pattern with a usage parameter meeting a preset condition as the reference biometric recognition pattern, according to the plurality of historical processing records. The historical processing records include biometric recognition patterns used for processing the target event.

According to a second aspect of the implementations of the present disclosure, there is provided a method for controlling an infrared fill light. The method includes the follows.

A reference biometric recognition pattern that is used by a mobile terminal to process a target event is obtained. A target fill-light strategy corresponding to the reference biometric recognition pattern is determined according to a pre-stored mapping relationship between biometric recognition patterns and fill-light strategies of the infrared fill light. The infrared fill light is controlled to fill light according to the target fill-light strategy, when the reference biometric recognition pattern is enabled.

In one implementation, the biometric recognition patterns comprise an iris recognition pattern, an infrared face recognition pattern, and a three-dimensional (3D) infrared face recognition pattern.

In one implementation, the obtaining a reference biometric recognition pattern that is used by a mobile terminal to process a target event includes: obtaining a security level of the target event, and determining a biometric recognition pattern corresponding to the obtained security level as the reference biometric recognition pattern of the target event, according to a pre-stored mapping relationship between security levels and biometric recognition patterns.

In one implementation, the obtaining a reference biometric recognition pattern that is used by a mobile terminal to process a target event includes: obtaining a plurality of historical processing records of the target event, and according to the plurality of historical processing records, determining a biometric recognition pattern with a usage parameter meeting a preset condition as the reference biometric recognition pattern. The historical processing records comprise biometric recognition patterns used for processing the target event.

In one implementation, according to the target fill-light strategy, the infrared fill light is controlled to emit infrared light at a first output power when the reference biometric recognition pattern is an iris recognition pattern.

In one implementation, according to the target fill-light strategy, the infrared fill light is controlled to emit infrared light at a second output power when the reference biometric recognition pattern is an infrared face recognition pattern.

In one implementation, according to the target fill-light strategy, the infrared fill light is controlled to emit infrared light at a third output power when the reference biometric recognition pattern is a three-dimensional infrared face recognition pattern.

The first output power, the second output power, and the third output power are different from each other.

In one implementation, the method can further include the follows.

A correspondence associated with a biometric recognition pattern is established, the correspondence being a correspondence between an output power of the infrared fill light and quality of infrared images captured by the infrared camera of the mobile terminal under the condition that the biometric recognition pattern is enabled.

A fill-light strategy of the infrared fill light corresponding to the biometric recognition pattern is generated according to the correspondence.

A mapping relationship between the biometric recognition pattern and the generated fill-light strategy of the infrared fill light is established.

According to a third aspect of the implementations of the present disclosure, there is provided a mobile terminal. The mobile terminal includes a processing unit and a communicating unit.

The processing unit is configured to obtain a reference biometric recognition pattern that is used when the mobile terminal processes a target event, determine a target fill-light strategy corresponding to the reference biometric recognition pattern according to a pre-stored mapping relationship between biometric recognition patterns and fill-light strategies of an infrared fill light, and control, through the communicating unit, the infrared fill light to fill light according to the target fill-light strategy when the reference biometric recognition pattern is enabled.

According to a fourth aspect of the implementations of the present disclosure, there is provided a mobile terminal. The mobile terminal includes a processor, a memory, a communication interface, and one or more programs.

The one or more programs are stored in the memory and include instructions that when executed, are operable with the processor to execute operations of any method according to the second aspect of the implementations of the present disclosure.

According to a fifth aspect of the implementations of the present disclosure, there is provided a non-transitory computer readable storage medium storing computer programs configured for electronic data interchange. The computer programs, when executed, are operable with a computer to perform all or part of operations of any method according to the second aspect of the implementations of the present disclosure. The computer includes a mobile terminal.

According to a sixth aspect of the implementations of the present disclosure, there is provided a computer program product. The computer program product includes a non-transitory computer readable storage medium for storing computer programs. The computer programs, when executed, are operable with a computer to perform all or part of operations of any method according to the second aspect of the implementations of the present disclosure. The computer program product can be a software installation package. The computer includes a mobile terminal.

Implementations of the present disclosure will be described with reference to the accompanying drawings in the following.

Referring to FIG. 1, FIG. 1 is a schematic structural diagram illustrating a mobile terminal 100 according to an implementation of the present disclosure. The mobile terminal 100 includes a housing 110, a touch display screen 120, a main board 130, a battery 140, and a sub-board 150. The main board 130 is provided with an infrared fill light 131, an infrared camera 132, a front-facing camera 133, a processor 134, a memory 135, a power management chip 136, a subscriber identification module (SIM) card slot 137, and the like. The sub-board 150 is provided with a vibrator 151, an integrated audio cavity 152, a VOOC flash charging interface 153, and a fingerprint module 154.

The mobile terminal 100 can include a first biometric recognition unit and a second biometric recognition unit. The first biometric recognition unit and the second biometric recognition unit can be integrated in the above-mentioned infrared camera 132. The first biometric recognition unit and the second biometric recognition unit can be a same circuit or can be different circuits.

The first biometric recognition unit is configured to acquire first biometric information.

The second biometric recognition unit is configured to acquire second biometric information. The second biometric information is different from the first biometric information.

In one implementation, the mobile terminal 100 can further include a third biometric recognition.

The third biometric recognition unit is configured to acquire third biometric information. The second biometric information is different from the first biometric information. The first biometric information, the second biometric information, and the third biometric information are different from each other.

The third biometric recognition unit can be integrated in the infrared camera 132. The third biometric recognition unit can be a same circuit as the circuit of the first biometric recognition unit or the second biometric recognition unit. Or, the third biometric recognition unit can be a different circuit with the circuit of the first biometric recognition unit or the second biometric recognition unit.

The first biometric recognition unit, the second biometric recognition unit, and the third biometric recognition unit are each selected from a group consisting of: an iris recognition unit, an infrared face recognition unit (that is two-dimensional infrared face recognition unit), and a three-dimensional (3D) infrared face recognition unit. The infrared fill light being further configured to fill light according to a third fill-light strategy when the third biometric recognition unit acquires the third biometric information.

The iris recognition unit can be the infrared camera 132, the infrared face recognition unit can be the infrared camera 132 or other preset device, the 3D infrared face recognition unit can be the infrared camera 132 or other preset device, and the present disclosure is not limited thereto.

The infrared fill light 131 is configured to emit infrared light to illuminate a user's iris to form reflected light. The infrared camera 132 is configured to collect the reflected light to form an iris image. The processor 134 is configured to obtain the iris image and then preprocess the iris image to obtain iris feature information.

The infrared fill light 131 is configured to emit infrared light to illuminate the user's face to form reflected light. The infrared camera 132 is configured to collect the reflected light to form a facial image. The facial image can be 2D facial image or 3D facial image. The processor 134 is configured to obtain the facial image and then preprocess the facial image to obtain facial feature information. The facial feature information can be 2D facial feature information or 3D facial feature information.

The infrared fill light 131 is configured to fill light according to a first fill-light strategy when the first biometric recognition unit acquires the first biometric information, and fill light according to a second fill-light strategy when the second biometric recognition unit acquires the second biometric information. The second fill-light strategy is different from the first fill-light strategy.

It can be seen that the mobile terminal can enable different fill-light strategies for different biometric recognition patterns so as to realize differentiated control of the infrared fill light, thereby improving the accuracy of the mobile terminal's control of the infrared light and power management efficiency.

In an implementation, according to the first fill-light strategy, the infrared fill light is controlled to emit infrared light at a first output power. According to the second fill-light strategy, the infrared fill light is controlled to emit infrared light at a second output power. The first output power is different from the second output power.

In an implementation, the processor 134 is configured to obtain a reference biometric recognition pattern that is used when the mobile terminal processes a target event, determine a target fill-light strategy corresponding to the reference biometric recognition pattern according to a mapping relationship in the memory 135, and control the infrared fill light 131 to fill light according to the target fill-light strategy when the reference biometric recognition pattern is enabled. The mapping relationship refers to a mapping relationship between biometric recognition patterns and fill-light strategies of the infrared fill light.

In an implementation, the biometric recognition patterns include an iris recognition pattern, an infrared face recognition pattern, and a 3D infrared face recognition pattern.

In an implementation, in terms of obtaining the reference biometric recognition pattern that is used by the mobile terminal to process the target event, the processor 134 is configured to: obtain a security level of the target even and determine a biometric recognition pattern corresponding to the obtained security level according to a pre-stored mapping relationship between security levels and biometric recognition patterns, and use the determined biometric recognition pattern as the reference biometric recognition pattern of the target event.

In an implementation, in terms of obtaining the reference biometric recognition pattern that is used by the mobile terminal to process the target event, the processor 134 is configured to: obtain a plurality of historical processing records of the target event stored in the memory 135, determine, according to the plurality of historical processing records, a biometric recognition pattern with a usage parameter meeting a preset condition, and use the determined biometric recognition pattern as the reference biometric recognition pattern. The historical processing records include biometric recognition patterns used for processing the target event.

In an implementation, the reference biometric recognition pattern is the iris recognition pattern. In this case, according to the target fill-light strategy, the infrared fill light 131 is controlled to emit infrared light at a first output power.

In another implementation, the reference biometric recognition pattern is the infrared face recognition pattern. Here, according to the target fill-light strategy, the infrared fill light 131 is controlled to emit infrared light at a second output power.

In another implementation, the reference biometric recognition pattern is the 3D infrared face recognition pattern. Here, according to the target fill-light strategy, the infrared fill light 131 is controlled to emit infrared light at a third output power.

The first output power, the second output power, and the third output power are different from each other.

In the above-mentioned implementations, the first output power is less than the second output power, and the second output power is less than the third output power. For example, the first output power can be low-power (1 mW to 10 mW), the second output power can be medium-power (20 mW to 50 mW), and the third output power can be high-power (50 mW to 100 mW or more). Such configuration can distinguish three kinds of biometric recognition patterns effectively and improve power management efficiency.

In one implementation, the processor 134 is further configured to establish a first correspondence associated with the iris recognition pattern, generate a first fill-light strategy of the infrared fill light corresponding to the iris recognition pattern according to the first correspondence, and establish a mapping relationship between the iris recognition pattern and the generated first fill-light strategy of the infrared fill light. The first correspondence is a correspondence between an output power of the infrared fill light and quality of infrared images captured by the infrared camera of the mobile terminal under the condition that the iris recognition pattern is enabled.

In the above-mentioned implementation, according to the first fill-light strategy, the infrared fill light is controlled to emit infrared light at a first output power, the first output power can correspond to the best quality (for example, a best resolution, or a best definition) of infrared images captured by the infrared camera of the mobile terminal under the condition that the iris recognition pattern is enabled.

In one implementation, the processor 134 is further configured to establish a second correspondence associated with the infrared face recognition pattern, generate a second fill-light strategy of the infrared fill light corresponding to the infrared face recognition pattern according to the second correspondence, and establish a mapping relationship between the infrared face recognition pattern and the generated second fill-light strategy of the infrared fill light. The second correspondence is a correspondence between an output power of the infrared fill light and quality of infrared images captured by the infrared camera of the mobile terminal under the condition that the infrared face recognition pattern is enabled.

In the above-mentioned implementation, according to the second fill-light strategy, the infrared fill light is controlled to emit infrared light at a second output power, the first output power can correspond to the best quality of infrared images captured by the infrared camera of the mobile terminal under the condition that the infrared face recognition pattern is enabled.

In one implementation, the processor 134 is further configured to establish a third correspondence associated with the 3D infrared face recognition pattern, generate a third fill-light strategy of the infrared fill light corresponding to the 3D infrared face recognition pattern according to the third correspondence, and establish a mapping relationship between the 3D infrared face recognition pattern and the generated third fill-light strategy of the infrared fill light. The third correspondence is a correspondence between an output power of the infrared fill light and quality of infrared images captured by the infrared camera of the mobile terminal under the condition that the 3D infrared face recognition pattern is enabled.

In the above-mentioned implementation, according to the third fill-light strategy, the infrared fill light is controlled to emit infrared light at a third output power, the first output power can correspond to the best quality of infrared images captured by the infrared camera of the mobile terminal under the condition that the 3D infrared face recognition pattern is enabled.

The processor 134 is a control center of the mobile terminal and is configured to connect each part of the mobile terminal via various interfaces and lines. By running or executing software programs and/or modules stored in the memory 135 and calling data stored in the memory 135, the processor 134 can perform various functions of the mobile terminal and process data, so as to achieve overall monitoring of the mobile terminal. In an implementation, the processor 134 can include one or more processing units. In an implementation, the processor 134 can be integrated with an application processor and a modem processor. The application processor is mainly configured to process an operating system(s), a user interface(s), an application(s), and the like. The modem processor is mainly configured to process wireless communication. It can be understood that the modem processor may not be integrated into the processor 134 as well.

The processor 134 may be, for example, a central processing unit (CPU), a general-purpose processor, a digital signal processor (DSP), an application-specific integrated circuit (ASIC), and a field programmable gate array (FPGA), or other programmable logic devices, transistor logic devices, hardware components, or any combination thereof. Various exemplary logical blocks, modules, and circuits described in conjunction with the disclosure may be achieved or implemented by the processor 134. The processor 134 can also be a combination of computing functions, for example, a combination containing one or more microprocessors, a combination of a DSP and a micro-processor, and the like.

The memory 135 is configured to store software programs and modules. The processor 134 is configured to perform various functions of the mobile terminal and process data by running or executing software programs and/or modules stored in the memory 135. The memory 135 can mainly include a program storage area and a data storage area. The program storage area is configured to store the operating system, applications required by at least one function, and the like. The data storage area is configured to store data created according to use of the mobile terminal and the like. In addition, the memory 135 may include a high-speed random access memory, and can further include a non-volatile memory, such as at least one magnetic disk memory, a flash memory, or other volatile solid-state memories. The memory 135 can be, for example, a random access memory (RAM), a flash memory, a read only memory (ROM), an erasable programmable ROM (EPROM), an electrically EPROM (EEPROM), a register, a hard disk, a mobile hard disk, a compact disc read-only memory (CD-ROM), or any other forms of storage medium known in the art.

Figure 2A:
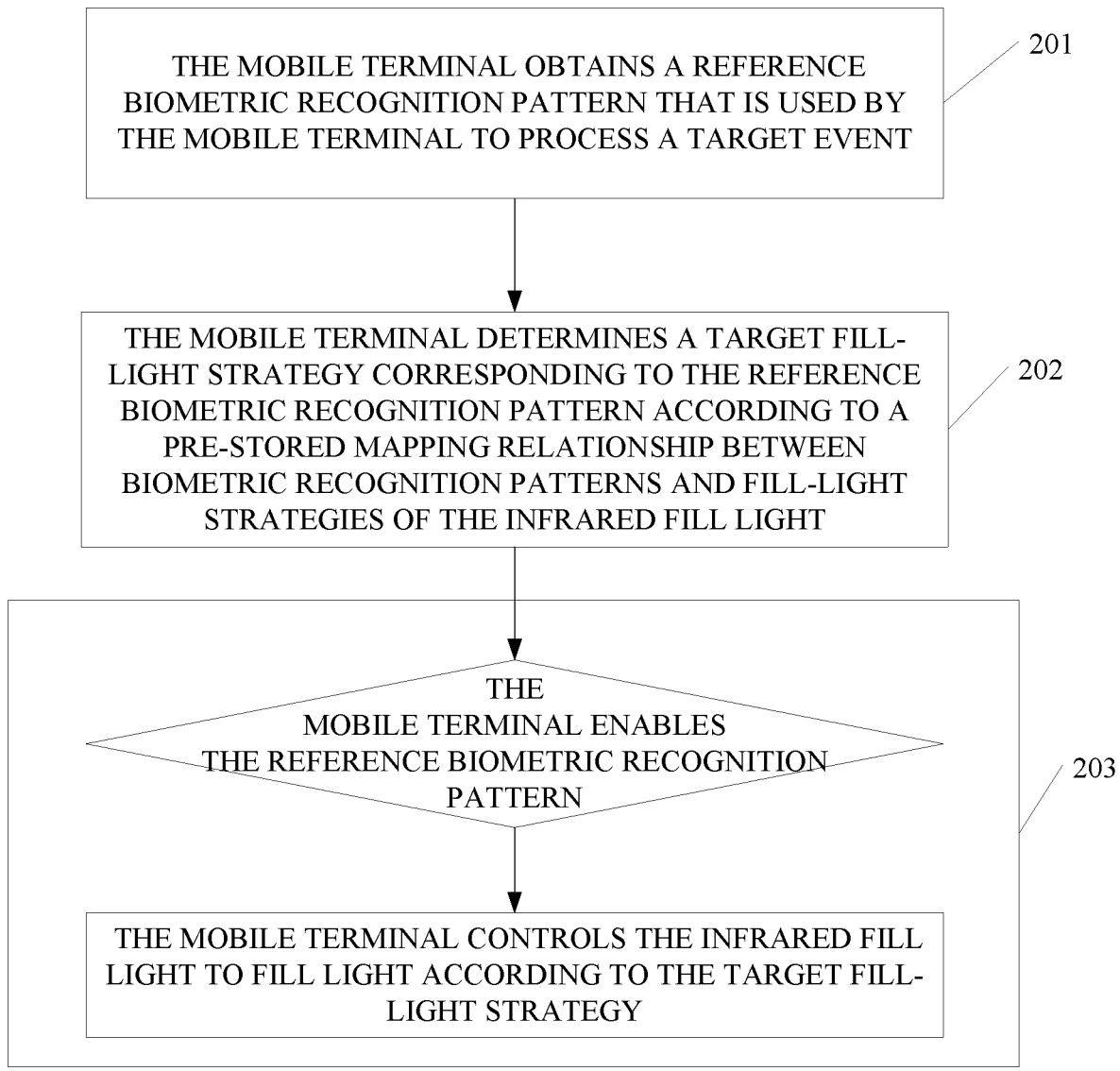
FIG. 2A is a schematic flow chart illustrating a method for controlling an infrared fill light according to an implementation of the present disclosure.

Referring to FIG. 2A, FIG. 2A is a schematic flow chart illustrating a method for controlling an infrared fill light according to an implementation of the present disclosure. The method is applicable to a mobile terminal as illustrated in FIG. 1. As illustrated in FIG. 2A, the method for controlling an infrared fill light starts with operations at block 201.

At block 201, the mobile terminal obtains a reference biometric recognition pattern that is used by the mobile terminal to process a target event.

The target event can be a file decryption event, an unlock and system-wakeup event, an unlock and screen light-up event, and other events that require user's biometric information for verification, and the present disclosure is not limited thereto.

At block 202, the mobile terminal determines a target fill-light strategy corresponding to the reference biometric recognition pattern according to a pre-stored mapping relationship between biometric recognition patterns and fill-light strategies of the infrared fill light.

At block 203, the mobile terminal controls the infrared fill light to fill light according to the target fill-light strategy when the reference biometric recognition pattern is enabled.

As can be seen, in the implementations of the present disclosure, the mobile terminal first obtains a reference biometric recognition pattern that is used by the mobile terminal to process a target event. Secondly, the mobile terminal determines a target fill-light strategy corresponding to the reference biometric recognition pattern according to a pre-stored mapping relationship between biometric recognition patterns and fill-light strategies of the infrared fill light. Finally, when the reference biometric recognition pattern is enabled, the mobile terminal controls the infrared fill light to fill light according to the target fill-light strategy. The mobile terminal can enable different fill-light strategies for different biometric recognition patterns so as to realize differentiated control of the infrared fill light, thereby improving the accuracy of the mobile terminal's control of the infrared light and power management efficiency.

In an implementation, the biometric recognition patterns include an iris recognition pattern, an infrared face recognition pattern, and a three-dimensional (3D) infrared face recognition pattern.

The iris recognition pattern can refer to a process that the mobile terminal captures (collects) the user's iris image through the infrared fill light and an infrared camera, and recognize the captured (collected) iris image to verify whether the current user is a registered user.

The infrared face recognition pattern can refer to a process that the mobile terminal captures the user's two-dimensional (2D) infrared facial image through the infrared fill light, the infrared camera, and other preset infrared cameras, and recognize the captured 2D infrared facial image to verify whether the current user is a registered user.

The 3D infrared face recognition pattern can refer to a process that the mobile terminal captures the user's 3D infrared facial image through the infrared fill light, the infrared camera, and other preset infrared cameras, and recognize the captured 3D infrared facial image to verify whether the current user is a registered user.

In an implementation, the mobile terminal obtains the reference biometric recognition pattern that is used by the mobile terminal to process the target event as follows. The mobile terminal obtains a security level of the target event, determines a biometric recognition pattern corresponding to the obtained security level according to a pre-stored mapping relationship between security levels and biometric recognition patterns, and use the determined biometric recognition pattern as the reference biometric recognition pattern of the target event.

In an implementation, the security level of the target event can be set by a system, set by the user, or can be set intelligently according to usage parameters such as usage frequency of the target event, which is not limited here. In one implementation, the higher usage frequency of the target event, the higher the security level of the target event.

The type of the security level can be set correspondingly according to various biometric recognition patterns supported by the mobile terminal. For example, the first security level corresponds to the iris recognition pattern supported by the mobile terminal, the second security level corresponds to the infrared face recognition pattern supported by the mobile terminal, and the third security level corresponds to the 3D infrared face recognition pattern supported by the mobile terminal. The present disclosure is not limited thereto.

As can be seen, in this implementation, the mobile terminal can quickly determine the reference biometric recognition pattern of the target event by querying the mapping relationship and therefore, user settings which consume additional processing time can be omitted, which is advantageous for improving speed and convenience of processing the target event by the mobile terminal.

In an implementation, the mobile terminal obtains the reference biometric recognition pattern that is used by the mobile terminal to process the target event as follows. The mobile terminal obtains a plurality of historical processing records of the target event and determines a biometric recognition pattern with a usage parameter meeting a preset condition according to the plurality of historical processing records. The determined diametric recognition pattern will be used as the reference biometric recognition pattern. The historical processing records include biometric recognition patterns used for processing the target event.

The usage parameter can include various types of parameters which can reflect user's tendency to use, such as the number of times of use, the frequency of use, and the duration of use, and the like, which is not limited herein.

As can be seen, in this implementation, the mobile terminal can intelligently determine a biometric recognition pattern that the user is accustomed to use when processing the target event according to the historical processing records, thereby improving interaction efficiency and avoiding extra processing time consumed by enabling a biometric recognition pattern that the user is not accustomed to use. It helps to improve accuracy and intelligence of the mobile terminal's control of biometric recognition patterns.

Figure 2B:
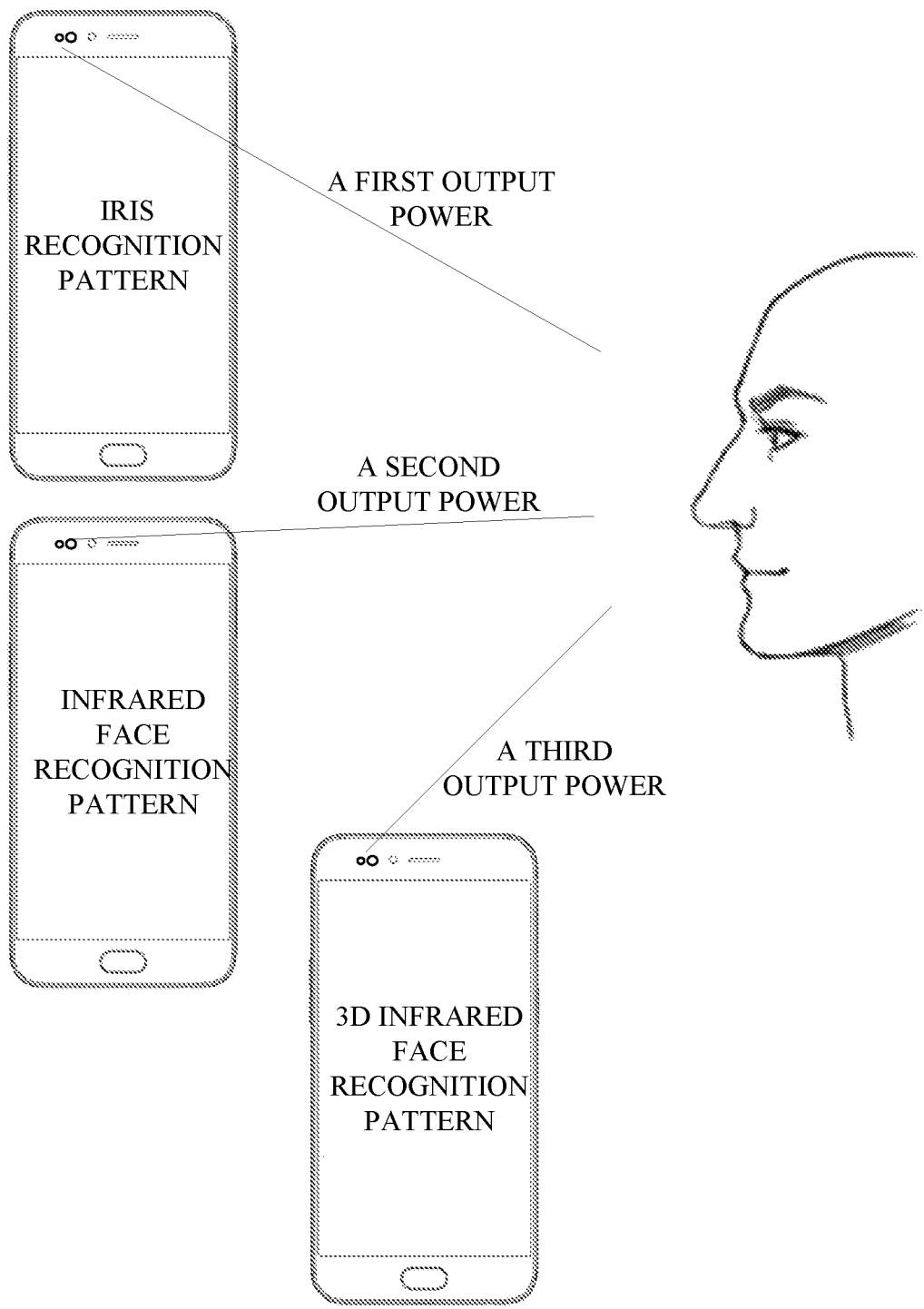
FIG. 2B is a schematic diagram illustrating a scenario of controlling an infrared fill light according to an implementation of present disclosure.

In an implementation, referring to FIG. 2B, FIG. 2B is a schematic diagram illustrating a scenario of controlling the infrared fill light.

In an implementation, the reference biometric recognition pattern is the iris recognition pattern. In this case, according to the target fill-light strategy, the infrared fill light is controlled to emit infrared light at a first output power.

In another implementation, the reference biometric recognition pattern is the infrared face recognition pattern. Here, according to the target fill-light strategy, the infrared fill light is controlled to emit infrared light at a second output power.

In another implementation, the reference biometric recognition pattern is the 3D infrared face recognition pattern. Here, according to the target fill-light strategy, the infrared fill light is controlled to emit infrared light at a third output power.

The first output power, the second output power, and the third output power are different from each other.

The first output power can be, for example, low-power (1 mW to 10 mW), the second output power can be, for example, medium-power (20 mW to 50 mW), and the third output power can be, for example, high-power (50 mW to 100 mW or more). Such configuration can distinguish three kinds of biometric recognition patterns effectively and improve power management efficiency.

It can be seen that, in this implementation, the mobile terminal can control the infrared fill light to emit light at different output powers for different biometric recognition patterns so as to realize differentiated control of the infrared fill light, thereby improving accuracy of the mobile terminal's control of the infrared light and power management efficiency.

In an implementation, the method can further include the follows before the mobile terminal obtains the reference biometric recognition pattern that is used by the mobile terminal to process the target event.

The mobile terminal establishes a first correspondence associated with the iris recognition pattern. The first correspondence refers to a correspondence between output powers of the infrared fill light and quality of infrared images captured by the infrared camera of the mobile terminal under the condition that the iris recognition pattern is enabled. The mobile terminal generates a first fill-light strategy of the infrared fill light corresponding to the iris recognition pattern according to the first correspondence. The mobile terminal establishes a mapping relationship between the iris recognition pattern and the generated first fill-light strategy of the infrared fill light.

The mobile terminal establishes a second correspondence associated with the infrared face recognition pattern. The second correspondence refers to a correspondence between output powers of the infrared fill light and quality of infrared images captured by the infrared camera of the mobile terminal under the condition that the infrared face recognition pattern is enabled. The mobile terminal generates a second fill-light strategy of the infrared fill light corresponding to the infrared face recognition pattern according to the second correspondence. The mobile terminal establishes a mapping relationship between the infrared face recognition pattern and the generated second fill-light strategy of the infrared fill light.

The mobile terminal establishes a third correspondence associated with the 3D infrared face recognition pattern. The third correspondence refers to a correspondence between output powers of the infrared fill light and quality of infrared images captured by the infrared camera of the mobile terminal under the condition that the 3D infrared face recognition pattern is enabled. The mobile terminal generates a third fill-light strategy of the infrared fill light corresponding to the 3D infrared face recognition pattern according to the third correspondence. The mobile terminal establishes a mapping relationship between the 3D infrared face recognition pattern and the generated third fill-light strategy of the infrared fill light.

As can be seen, in this implementation, the mobile terminal can detect intelligently a correspondence between output powers of the infrared fill light and quality of infrared images captured by the infrared camera of the mobile terminal under conditions of different biometric recognition patterns, generate a fill-light strategy of the infrared fill light corresponding to a biometric recognition pattern according to the correspondence, and finally establish a mapping relationship between the biometric recognition pattern and the fill-light strategy. The fill-light strategy determined as such can accurately match infrared light requirement of corresponding biometric recognition pattern, avoid situations of extra power consumption and insufficient fill light happening, and be advantageous to improve accuracy and intelligence of the mobile terminal's control the infrared light, and power management efficiency.

There can be a plurality of manners in which the mobile terminal obtains the reference biometric recognition pattern that is used by the mobile terminal to process the target event, which will be described in detail with reference to FIG. 3 to FIG. 4.

Figure 3:
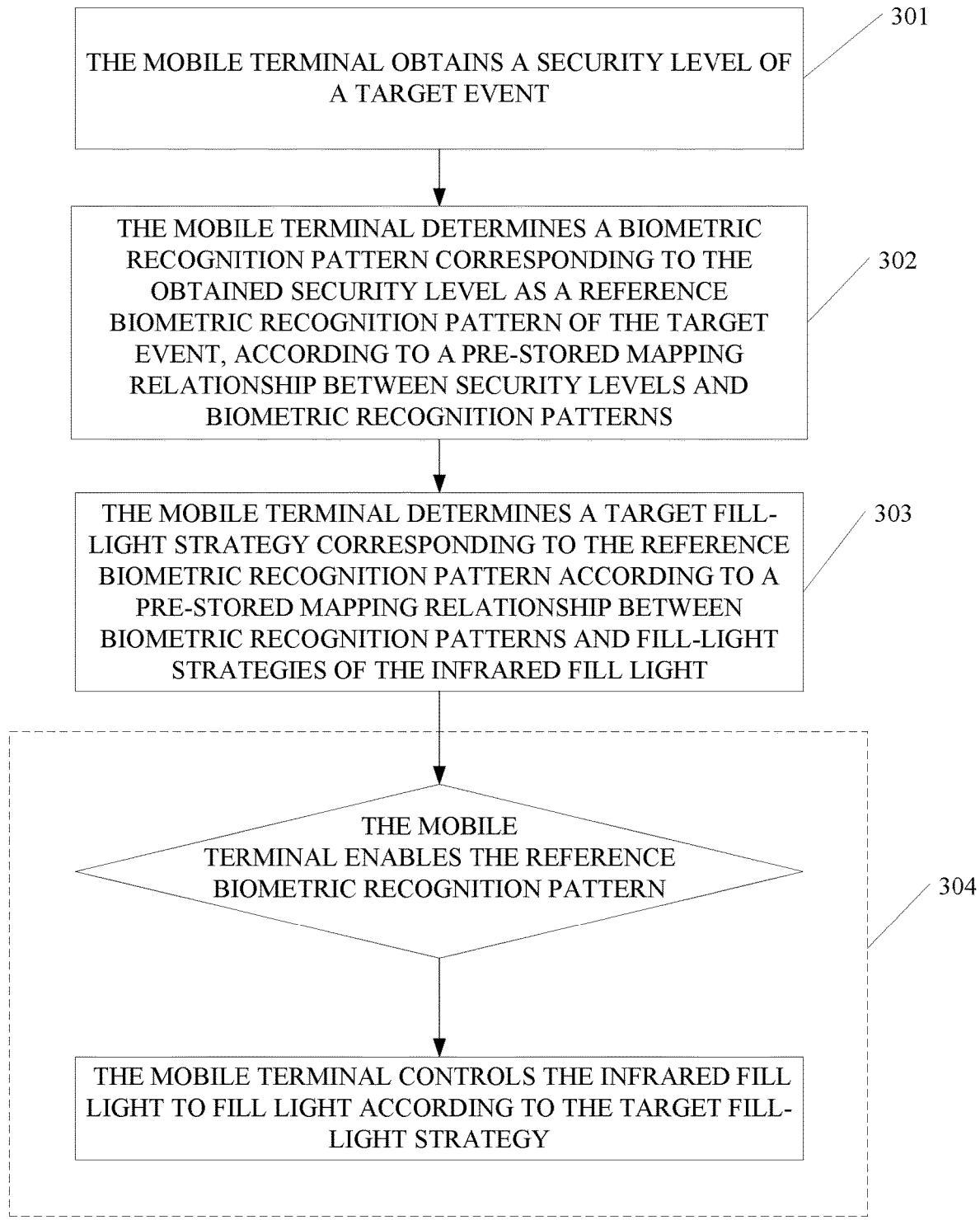
FIG. 3 is a schematic flow chart illustrating a method for controlling an infrared fill light according to an implementation of the present disclosure.

Consistent with the implementation illustrated in FIG. 2A, FIG. 3 is a schematic flow chart illustrating a method for controlling an infrared fill light according to an implementation of the present disclosure, which is applicable to a mobile terminal as illustrated in FIG. 1. The operations at block 301 and 302 of FIG. 3 describe the implementation of a reference biometric recognition pattern obtaining operation in detail on the basis of FIG. 2A. As illustrated in FIG. 3, the method for controlling an infrared fill light begins at block 301.

At block 301, the mobile terminal obtains a security level of a target event.

At block 302, the mobile terminal determines a biometric recognition pattern corresponding to the obtained security level as a reference biometric recognition pattern of the target event, according to a pre-stored mapping relationship between security levels and biometric recognition patterns.

At block 303, the mobile terminal determines a target fill-light strategy corresponding to the reference biometric recognition pattern according to a pre-stored mapping relationship between biometric recognition patterns and fill-light strategies of the infrared fill light.

At block 304, the mobile terminal controls the infrared fill light to fill light according to the target fill-light strategy when the reference biometric recognition pattern is enabled.

As can be seen, in the implementations of the present disclosure, the mobile terminal first obtains a reference biometric recognition pattern that is used by the mobile terminal to process a target event. Secondly, the mobile terminal determines a target fill-light strategy corresponding to the reference biometric recognition pattern according to a pre-stored mapping relationship between biometric recognition patterns and fill-light strategies of the infrared fill light. Finally, when the reference biometric recognition pattern is enabled, the mobile terminal controls the infrared fill light to fill light according to the target fill-light strategy. The mobile terminal can enable different fill-light strategies for different biometric recognition patterns so as to realize differentiated control of the infrared fill light, thereby improving accuracy of the mobile terminal's control the infrared light and power management efficiency.

In addition, the mobile terminal can quickly determine the reference biometric recognition pattern of the target event by querying the mapping relationship, and therefore, user settings which consume additional processing time can be omitted, which is advantageous for improving speed and convenience of processing the target event by the mobile terminal.

Figure 4:
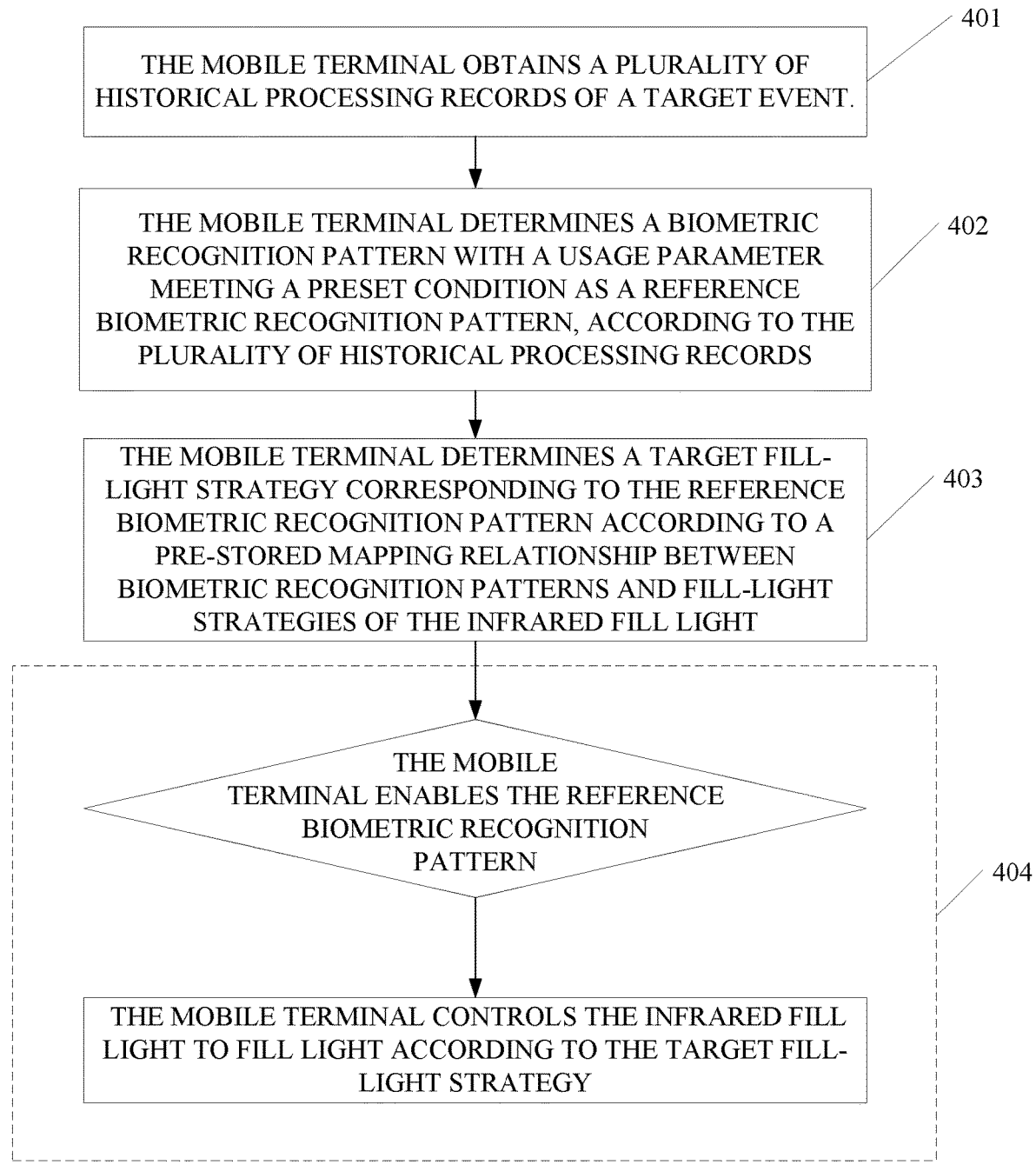
FIG. 4 is a schematic flow chart illustrating a method for controlling an infrared fill light according to an implementation of the present disclosure.

Consistent with the implementation illustrated in FIG. 2A, FIG. 4 is a schematic flow chart illustrating a method for controlling an infrared fill light according to an implementation of the present disclosure, which is applicable to a mobile terminal as illustrated in FIG. 1. The operations at block 401 and 402 of FIG. 4 describe another implementation of a reference biometric recognition pattern obtaining operation in detail on the basis of FIG. 2A. As illustrated in FIG. 4, the method for controlling an infrared fill light begins at block 401.

At block 401, the mobile terminal obtains a plurality of historical processing records of a target event. The historical processing records include biometric recognition patterns used for processing the target event.

At block 402, the mobile terminal determines a biometric recognition pattern with a usage parameter meeting a preset condition according to the plurality of historical processing records, and uses the determined biometric recognition pattern as a reference biometric recognition pattern.

At block 403, the mobile terminal determines a target fill-light strategy corresponding to the reference biometric recognition pattern according to a pre-stored mapping relationship between biometric recognition patterns and fill-light strategies of the infrared fill light.

At block 404, the mobile terminal controls the infrared fill light to fill light according to the target fill-light strategy when the reference biometric recognition pattern is enabled.

As can be seen, in the implementation of the present disclosure, the mobile terminal first obtains a reference biometric recognition pattern that is used by the mobile terminal to process a target event. Secondly, the mobile terminal determines a target fill-light strategy corresponding to the reference biometric recognition pattern according to a pre-stored mapping relationship between biometric recognition patterns and fill-light strategies of the infrared fill light. Finally, when the reference biometric recognition pattern is enabled, the mobile terminal controls the infrared fill light to fill light according to the target fill-light strategy. The mobile terminal can enable different fill-light strategies for different biometric recognition patterns so as to realize differentiated control of the infrared fill light, thereby improving accuracy of the mobile terminal's control the infrared light and power management efficiency.

In addition, the mobile terminal can intelligently determine a biometric recognition pattern that the user is accustomed to use when processing the target event according to the historical processing records, thereby improving interaction efficiency and avoiding extra processing time consumed by enabling a biometric recognition pattern that the user is not accustomed to use. It helps to improve accuracy and intelligence of the mobile terminal's control biometric recognition patterns.

Figure 5:
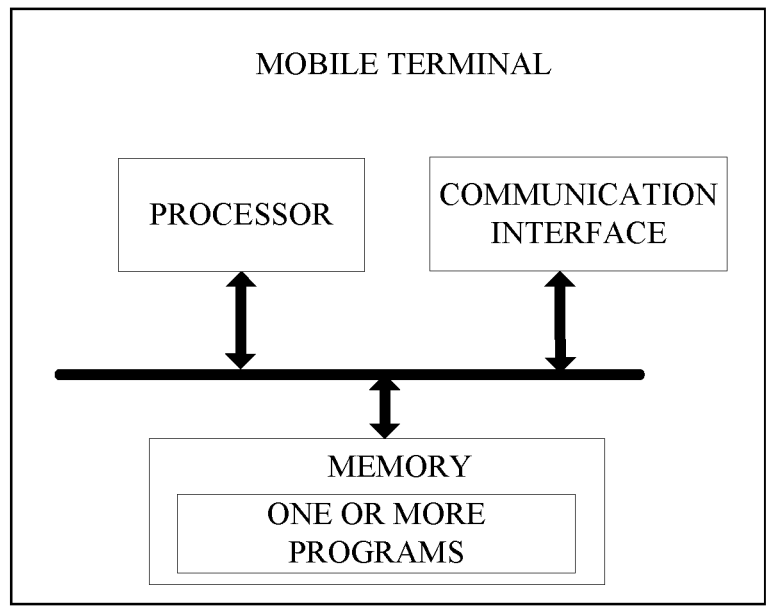
FIG. 5 is a schematic structural diagram illustrating a mobile terminal according to an implementation of the present disclosure.

Consistent with the implementations illustrated in FIG. 2A, FIG. 3, and FIG. 4, FIG. 5 is a schematic structural diagram illustrating a mobile terminal according to an implementation of the present disclosure. As illustrated in FIG. 5, the mobile terminal can include a processor, a memory, a communication interface, and one or more programs.

The one or more programs are stored in the memory and include instructions that when executed, are operable with the processor to: obtain a reference biometric recognition pattern that is used by the mobile terminal to process a target event, determine a target fill-light strategy corresponding to the reference biometric recognition pattern according to a pre-stored mapping relationship between biometric recognition patterns and fill-light strategies of the infrared fill light, and control the infrared fill light to fill light according to the target fill-light strategy when the reference biometric recognition pattern is enabled.

As can be seen, in the implementations of the present disclosure, the mobile terminal first obtains a reference biometric recognition pattern that is used by the mobile terminal to process a target event. Secondly, the mobile terminal determines a target fill-light strategy corresponding to the reference biometric recognition pattern according to a pre-stored mapping relationship between biometric recognition patterns and fill-light strategies of the infrared fill light. Finally, when the reference biometric recognition pattern is enabled, the mobile terminal controls the infrared fill light to fill light according to the target fill-light strategy. The mobile terminal can enable different fill-light strategies for different biometric recognition patterns so as to realize differentiated control of the infrared fill light, thereby improving accuracy of the mobile terminal's control the infrared light and power management efficiency.

In an implementation, the biometric recognition patterns include an iris recognition pattern, an infrared face recognition pattern, and a three-dimensional (3D) infrared face recognition pattern.

In an implementation, the instructions that when executed, are operable with the processor to obtain the reference biometric recognition pattern that is used by the mobile terminal to process the target event are further operable with the processor to obtain a security level of the target event and determine a biometric recognition pattern corresponding to the obtained security level as the reference biometric recognition pattern of the target event, according to a pre-stored mapping relationship between security levels and biometric recognition patterns.

In an implementation, the instructions that when executed, are operable with the processor to obtain the reference biometric recognition pattern that is used by the mobile terminal to process the target event are further operable with the processor to obtain a plurality of historical processing records of the target event and determine a biometric recognition pattern with a usage parameter meeting a preset condition as the reference biometric recognition pattern, according to the plurality of historical processing records. The historical processing records include biometric recognition patterns used for processing the target event.

In an implementation, the reference biometric recognition pattern is an iris recognition pattern. In this case, according to the target fill-light strategy, the infrared fill light is controlled to emit infrared light at a first output power.

In another implementation, the reference biometric recognition pattern is an infrared face recognition pattern. Here, according to the target fill-light strategy, the infrared fill light is controlled to emit infrared light at a second output power.

In another implementation, the reference biometric recognition pattern is a 3D infrared face recognition pattern. Here, according to the target fill-light strategy, the infrared fill light is controlled to emit infrared light at a third output power.

The first output power, the second output power, and the third output power are different from each other.

The foregoing technical solutions of the implementations of the disclosure are mainly described from the viewpoint of execution of the method. It can be understood that, in order to implement the above functions, the mobile terminal includes hardware structures and/or software modules corresponding to the respective functions. Those skilled in the art should readily recognize that, in combination with the exemplary units and scheme steps or operations described in the implementations disclosed herein, the present disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the present disclosure.

According to the implementations of the disclosure, functional units of a mobile terminal can be divided in accordance with the foregoing method examples. For example, functional units may be divided according to corresponding functions, and two or more functions may be integrated into one processing unit. The above-mentioned integrated unit can be implemented in the form of hardware or software functional units. It should be noted that the division of units in the implementations of the present disclosure is schematic and is merely a logical function division; there may be other division manners in actual implementations.

Figure 6:
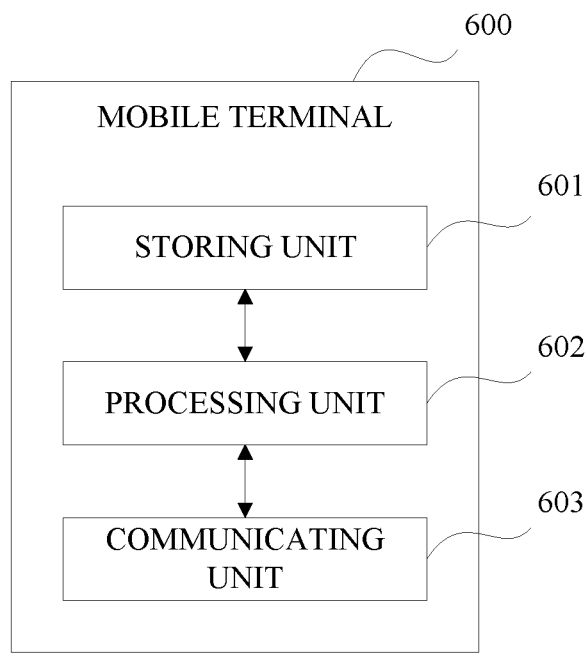
FIG. 6 is a schematic block diagram illustrating functional units of a mobile terminal according to an implementation of the present disclosure.

In a case of using integrated units, FIG. 6 is a block diagram illustrating possible functional units of the mobile terminal involved in the above-mentioned implementations. The mobile terminal 600 includes a processing unit 602 and a communicating unit 603. The processing unit 602 is configured to control and manage actions of the mobile terminal. For example, the processing unit 602 is configured to support the mobile terminal to perform operations at block 201 to 203 in FIG. 2A, operations at block 301 to 304 in FIG. 3, operations at block 401 to 404 in FIG. 4 and/or other processes of techniques described herein. The communicating unit 603 is configured to support a communication between the processor and peripherals of the mobile terminal, such as a communication between the processor and the infrared fill light. The mobile terminal can further include a storing unit 601 configured to store program codes and data of the mobile terminal.

the processing unit 602 is configured to obtain a reference biometric recognition pattern that is used when the mobile terminal processes a target event, determine a target fill-light strategy corresponding to the reference biometric recognition pattern according to a pre-stored mapping relationship between biometric recognition patterns and fill-light strategies of an infrared fill light, and control, through the communicating unit, the infrared fill light to fill light according to the target fill-light strategy when the reference biometric recognition pattern is enabled.

In an implementation, the biometric recognition patterns include an iris recognition pattern, an infrared face recognition pattern, and a three-dimensional (3D) infrared face recognition pattern.

In an implementation, in terms of obtaining the reference biometric recognition pattern that is used by the mobile terminal to process the target event, the processor unit 602 is further configured to obtain a security level of the target event and determine a biometric recognition pattern corresponding to the obtained security level as the reference biometric recognition pattern of the target event, according to a pre-stored mapping relationship between security levels and biometric recognition patterns.

In an implementation, in terms of obtaining the reference biometric recognition pattern that is used by the mobile terminal to process the target event, the processor unit 602 is further configured to obtain a plurality of historical processing records of the target event and determine a biometric recognition pattern with a usage parameter meeting a preset condition as the reference biometric recognition pattern, according to the plurality of historical processing records. The historical processing records include biometric recognition patterns used for processing the target event.

In an implementation, the reference biometric recognition pattern is an iris recognition pattern. In this case, according to the target fill-light strategy, the infrared fill light is controlled to emit infrared light at a first output power.

In another implementation, the reference biometric recognition pattern is an infrared face recognition pattern. Here, according to the target fill-light strategy, the infrared fill light is controlled to emit infrared light at a second output power.

In another implementation, the reference biometric recognition pattern is a 3D infrared face recognition pattern. Here, according to the target fill-light strategy, the infrared fill light is controlled to emit infrared light at a third output power.

The first output power, the second output power, and the third output power are different from each other.

The processing unit 602 can include a processor or a controller. The communicating unit 603 can include an internal communication bus and the like. The storing unit 601 can include a memory.

The implementations of the present disclosure also provide a non-transitory computer readable storage medium. The computer readable storage medium stores computer programs for electronic data interchange which, when executed, being operable with a computer to accomplish all or part of the operations of any methods described in the above-described method implementations. The computer includes a mobile terminal.

The implementations of the present disclosure also provide a computer program product. The computer program product includes a non-transitory computer readable storage medium for storing computer programs. The computer programs are operable with a computer to perform all or part of the operations of any method described in the above method implementations. The computer program product can be a software installation package. The computer includes a mobile terminal.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A mobile terminal, comprising:
   a first biometric recognition unit, configured to acquire first biometric information;
   a second biometric recognition unit, configured to acquire second biometric information, the second biometric information being different from the first biometric information; and
   an infrared fill light, configured to fill light according to a first fill-light strategy when the first biometric recognition unit acquires the first biometric information, and fill light according to a second fill-light strategy when the second biometric recognition unit acquires the second biometric information, the second fill-light strategy being different from the first fill-light strategy, wherein, according to the first fill-light strategy, the infrared fill light is controlled to emit infrared light at a first output power, wherein, according to the second fill-light strategy, the infrared fill light is controlled to emit infrared light at a second output power, and wherein the first output power is different from the second output power.

2. The mobile terminal of claim 1, further comprising:

a third biometric recognition unit, configured to acquire third biometric information; and the infrared fill light being further configured to fill light according to a third fill-light strategy when the third biometric recognition unit acquires the third biometric information, wherein, according to the third fill-light strategy, the infrared fill light is controlled to emit infrared light at a third output power, and wherein the third output power is different from the first output power and the second output power.

3. The mobile terminal of claim 2, wherein the first biometric recognition unit, the second biometric recognition unit, and the third biometric recognition unit are each selected from a group consisting of: an iris recognition unit, an infrared face recognition unit, and a three-dimensional (3D) infrared face recognition unit; and the first biometric recognition unit, the second biometric recognition unit, and the third biometric recognition unit are different from each other.

4. The mobile terminal of claim 3, wherein when the first biometric recognition unit is the iris recognition unit, the second biometric recognition unit is the infrared face recognition unit, and the third biometric recognition unit is the 3D infrared face recognition unit, the first output power is less than the second output power, and the second output power is less than the third output power.

5. The mobile terminal of claim 4, further comprising:

a processor, configured to obtain reference biometric recognition pattern that is used by the mobile terminal to process a target event; determine a target fill-light strategy corresponding to the reference biometric recognition pattern according to a pre-stored mapping relationship between biometric recognition patterns and fill-light strategies of the infrared fill light; and control the infrared fill light to fill light according to the target fill-light strategy when the reference biometric recognition pattern is used to process the target event, wherein the reference biometric recognition pattern is one of an iris recognition pattern, an infrared face recognition pattern, or a 3D infrared face recognition pattern, wherein, according to the target fill-light strategy, the infrared fill light is controlled to emit infrared light at the first output power when the reference biometric recognition pattern is the iris recognition pattern, wherein, according to the target fill-light strategy, the infrared fill light is controlled to emit infrared light at the second output power when the reference biometric recognition pattern is the infrared face recognition pattern, and wherein, according to the target fill-light strategy, the infrared fill light is controlled to emit infrared light at the third output power when the reference biometric recognition pattern is the three-dimensional infrared face recognition pattern.

6. The mobile terminal of claim 5, wherein the biometric recognition patterns comprise an iris recognition pattern, an infrared face recognition pattern, and a 3D infrared face recognition pattern.

7. The mobile terminal of claim 6, wherein the processor is further configured to:

establish a second correspondence associated with the infrared face recognition pattern, wherein the second correspondence being a correspondence between an output power of the infrared fill light and quality of infrared images captured by an infrared camera of the mobile terminal under a condition that the infrared face recognition pattern is used;

generate a second fill-light strategy of the infrared fill light corresponding to the infrared face recognition pattern according to the second correspondence; and establish a mapping relationship between the infrared face recognition pattern and the generated second fill-light strategy of the infrared fill light.

8. The mobile terminal of claim 6, wherein the processor is further configured to:

establish a first correspondence associated with the iris recognition pattern, wherein the first correspondence being a correspondence between an output power of the infrared fill light and quality of infrared images captured by an infrared camera of the mobile terminal under a condition that the iris recognition pattern is used;

generate a first fill-light strategy of the infrared fill light corresponding to the iris recognition pattern according to the first correspondence; and establish a mapping relationship between the iris recognition pattern and the generated first fill-light strategy of the infrared fill light.

9. The mobile terminal of claim 6, wherein the processor is further configured to:

establish a third correspondence associated with the 3D infrared face recognition pattern, wherein the third correspondence being a correspondence between an output power of the infrared fill light and quality of infrared images captured by an infrared camera of the mobile terminal under a condition that the 3D infrared face recognition pattern is used;

generate a third fill-light strategy of the infrared fill light corresponding to the 3D infrared face recognition pattern according to the third correspondence; and establish a mapping relationship between the 3D infrared face recognition pattern and the generated third fill-light strategy of the infrared fill light.

10. The mobile terminal of claim 5, wherein the processor configured to obtain the reference biometric recognition pattern that is used by the mobile terminal to process the target event is further configured to:

obtain a security level of the target event; and determine a biometric recognition pattern corresponding to the obtained security level as the reference biometric recognition pattern of the target event, according to a pre-stored mapping relationship between security levels and biometric recognition patterns.

11. The mobile terminal of claim 5, wherein the processor configured to obtain the reference biometric recognition pattern that is used by the mobile terminal to process the target event is further configured to:

obtain a plurality of historical processing records of the target event, wherein the plurality of historical processing records comprises biometric recognition patterns used for processing the target event; and determine a biometric recognition pattern with a usage parameter meeting a preset condition as the reference biometric recognition pattern, according to the plurality of historical processing records.

12. The mobile terminal of claim 11, wherein the usage parameter comprises at least one of: a number of times of use, a frequency of use, and a duration of use.

13. A method for controlling an infrared fill light, comprising:

obtaining a reference biometric recognition pattern that is used by a mobile terminal to process a target event, wherein the reference biometric recognition pattern is one of an iris recognition pattern, an infrared face recognition pattern, or a 3D infrared face recognition pattern;

determining a target fill-light strategy corresponding to the reference biometric recognition pattern according to a pre-stored mapping relationship between biometric recognition patterns and fill-light strategies of the infrared fill light; and controlling the infrared fill light to fill light according to the target fill-light strategy when the reference biometric recognition pattern is used to process the target event, wherein, according to the target fill-light strategy, the infrared fill light is controlled to emit infrared light at a first output power when the reference biometric recognition pattern is the iris recognition pattern;

wherein, according to the target fill-light strategy, the infrared fill light is controlled to emit infrared light at a second output power when the reference biometric recognition pattern is the infrared face recognition pattern;

wherein, according to the target fill-light strategy, the infrared fill light is controlled to emit infrared light at a third output power when the reference biometric recognition pattern is the three-dimensional infrared face recognition pattern, and wherein the first output power, the second output power, and the third output power are different from one another.

14. The method of claim 13, wherein the biometric recognition patterns comprise an iris recognition pattern, an infrared face recognition pattern, and a three-dimensional (3D) infrared face recognition pattern.

15. The method of claim 13, wherein the obtaining a reference biometric recognition pattern that is used by a mobile terminal to process a target event comprises:

obtaining a security level of the target event; and determining a biometric recognition pattern corresponding to the obtained security level as the reference biometric recognition pattern of the target event, according to a pre-stored mapping relationship between security levels and biometric recognition patterns.

16. The method of claim 13, wherein the obtaining a reference biometric recognition pattern that is used by the mobile terminal to process the target event comprises:

obtaining a plurality of historical processing records of the target event, wherein the plurality of historical processing records comprises biometric recognition patterns used for processing the target event; and according to the plurality of historical processing records, determining a biometric recognition pattern with a usage parameter meeting a preset condition as the reference biometric recognition pattern.

17. The method of claim 13, further comprising:

establishing a correspondence associated with a biometric recognition pattern, the correspondence being a correspondence between an output power of the infrared fill light and quality of images captured by an infrared camera of the mobile terminal under a condition that the biometric recognition pattern is used;

generating a fill-light strategy of the infrared fill light corresponding to the biometric recognition pattern according to the correspondence; and establishing a mapping relationship between the biometric recognition pattern and the generated fill-light strategy of the infrared fill light.

18. A non-transitory computer readable storage medium, storing computer programs configured for electronic data interchange, wherein the computer programs, when executed, are operable with a computer to:

obtain a reference biometric recognition pattern that is used by a mobile terminal to process a target event, wherein the reference biometric recognition pattern is one of an iris recognition pattern, an infrared face recognition pattern, or a 3D infrared face recognition pattern;

determine a target fill-light strategy corresponding to the reference biometric recognition pattern according to a pre-stored mapping relationship between biometric recognition patterns and fill-light strategies of infrared fill light; and control the infrared fill light to fill light according to the target fill-light strategy when the reference biometric recognition pattern is used to process the target event, wherein, according to the target fill-light strategy, the infrared fill light is controlled to emit infrared light at a first output power when the reference biometric recognition pattern is the iris recognition pattern;

wherein, according to the target fill-light strategy, the infrared fill light is controlled to emit infrared light at a second output power when the reference biometric recognition pattern is the infrared face recognition pattern; and wherein, according to the target fill-light strategy, the infrared fill light is controlled to emit infrared light at a third output power when the reference biometric recognition pattern is the three-dimensional infrared face recognition pattern.

* * * * *